United States Patent Office 3,268,571
Patented August 23, 1966

3,268,571
DIFLUOROMETHYL ESTERS AND PROCESS
FOR THEIR PREPARATION
Ronald A. Mitsch, Falcon Heights, Minn., assignor to
Minnesota Mining and Manufacturing Company, St.
Paul, Minn., a corporation of Delaware
No Drawing. Filed Apr. 6, 1964, Ser. No. 358,146
15 Claims. (Cl. 260—456)

This invention relates to fluorine-containing esters and more particularly to a novel process for the preparation of difluoromethyl esters.

It is an object of the present invention to provide a process for the preparation of a class of useful chemical intermediates. It is another object of the invention to provide a process for the preparation of difluoromethyl esters of carboxylic and sulfonic acids. It is another object of the invention to provide certain novel and useful sulfonic acid esters. Other objects of the invention will become apparent in the light of the following specification.

The process of the invention relates to the preparation of difluoromethyl esters of carboxylic and sulfonic acids by reacting the corresponding acid with difluorocarbene (which can be generated by pyrolysis and/or photolysis of difluorodiazirine, see R. A. Mitsch, J. Heterocyclic Chemistry, Vol. 1, page 59, Feb. 1964). The process can be represented by the following equation:

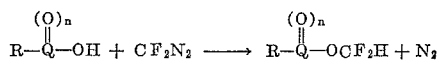

wherein R is an organic radical which is free of groups containing active hydrogen having $pK_a$ greater than 7, Q is carbon or sulfur in its highest oxidation state which is bonded to a carbon atom in the R group and $n$ is 1–2.

Difluoromethyl difluoroacetate and difluoromethyl fluorosulfonate have been disclosed heretofore (see N. N. Yarovenko, M. A. Rakasha, J. N. Shemanina and A. S. Vasilyeva, J. Gen. Chem. U.S.S.R., 27, 2305 (1957) and G. A. Sokol' skii and M. A. Dmitriev, J. Gen. Chem. U.S.S.R. 31, 648 (1961)). The former was reported as a product of the reaction of mercury difluoroacetate with iodine. That process, however, has the disadvantages of utilizing the mercury salt of the acid (thereby requiring an added synthesis and isolation step) and requiring difluoroiodomethane (which is prepared only with difficulty). The difluoromethyl fluorosulfonate was apparently prepared in low yield by the electrochemical fluorination of methylchlorosulfonate. This compound (in which a fluorine atom is bonded to the sulfur atom of the ester group) is not a reactive ester intermediate since it tends to decompose when contacted with another reactive material.

The organic radical R is required to be free from active hydrogen having $pK_a$ greater than 7. The reason for this is that groups containing active hydrogen having $pK_a$ greater than 7 either undergo side reactions instead of the difluoromethyl ester-forming reaction or will cause decomposition of the difluoromethyl ester itself. Thus R can include aliphatic, aromatic and mixed aliphatic and aromatic groups which can be unsubstituted or substituted and which can contain hetero atoms such as nitrogen, oxygen, sulfur, etc. Among the possible substituents are halo, nitro, fluoramino, difluoramino, cyano, keto, carboxyl, acyl, anhydride, carboalkoxy, sulfonic acid, sulfonate, etc. Preferably R contains not more than 18 carbon atoms. More particularly these include substituted and unsubstituted alkyl, aryl, polyhaloalkyl, polyhaloaryl, alkaryl, aralkyl, polyhaloalkaryl, polyhaloaralkyl, heterocyclic and polyhaloheterocyclic radicals. Certain groups which ordinarily contain active hydrogen having $pK_a$ greater than 7 can be present in the R groups provided that they are suitably blocked (i.e. so that they temporarily contain no such active hydrogen) during the difluoromethyl ester-forming reaction and so long as the difluoromethyl ester group is present.

The process of the invention is generally carried out by dissolving the acid in a solvent in which it has at least moderate solubility and which is inert with respect to the reactants and products of the reaction at the temperature employed. In the case of liquid acids, however, no solvent is usually required. The difluorodiazirine is then introduced, conveniently by condensation or by pressurization. Varying the quantities of the reactants used has little effect on the products obtained in the reaction (the yield of product being calculated on the basis of the limiting reagent). When a dibasic acid is being reacted with difluorodiazirine, however, the concentration of the reactants will have an effect on the product distribution. Thus, if the bis(difluoromethyl ester) is desired, a large excess of difluorodiazirine would be used. An excess of the acid reactant would result in a major product of mono(difluoromethyl ester) and a minor product of the bis(difluoromethyl ester). The bis(difluoromethyl ester) can be prepared from the mono ester by further reaction with difluorocarbene.

The reaction is initiated either by photolysis or pyrolysis or a combination thereof when difluorodiazirine is utilized as the source of difluorocarbene (which reacts with the acid to give the desired difluoromethyl ester). The time and temperature required for the reaction vary widely, depending upon the acid reactant, the quantity of difluorodiazirine utilized and type of carbene initiator.

The photolytic technique is generally utilized in cases in which the acid does not appreciably absorb ultraviolet irradiation in the 3000–4000 A. region. The pyrolysis technique, on the other hand, is suitable for those acids which have strong ultraviolet absorbance in the 3000–4000 A. region. The preferred reaction conditions are those employed in the photolytic technique, since in some cases the difluoromethyl ester products may themselves begin to decompose at the temperatures of the reaction which are utilized in the pyrolysis technique.

When pyrolysis is used to generate difluorocarbene from difluorodiazirine, the reaction can be carried out in a pressure vessel such as a stainless steel bomb or heavy-walled glass ampoule. The reaction times generally range from about 2 hours to 3 days or more and the temperatures from about 100° to 165° C. When the reaction is initiated by pyrolysis. At lower temperatures the rate of generation of difluorocarbene is unnecessarily slow, while at higher temperatures the rate of generation of difluorocarbene is often excessive and there is a possibility of reducing the yield of difluoromethyl ester by inadequate mixing of the reactants or by actual degradation of the products. Within the specified ranges, the time and temperature are interrelated. Thus the reaction is ordinarily continued for approximately 24 hours when a temperature range of 120° to 130° C. is utilized, while at temperatures of 150° to 165° C. only about 3 hours are usually required for the preparation of the difluoromethyl esters.

When photolytic carbene initiation is used, the reaction is carried out by placing the reactants in a glass ampoule which is transparent to wavelengths of ultraviolet light of 3000–4000 A. and exposing the liquid phase of the stirred reaction mixture to ultraviolet irradiation. A temperature of from about 0–100° C. is preferable for photolysis. Although reaction can occur in many cases below this temperature range, there are few compensating advantages to such lower reaction temperatures. The ultraviolet irradiation is continued until examination of the volatile products of the reaction indicates the absence of difluorodiazirine.

The difluoromethyl ester products are generally liquids or solids under the conditions of the reaction and are removed by conventional techniques, e.g., by extraction, by distillation and condensation in one or more suitably cooled traps and/or by preparative vapor phase chromatographic techniques in the case of liquids and/or crystallization in the case of solid difluoromethyl esters. The process ordinarily proceeds smoothly to completion and results in very high yields of difluoromethyl esters in many cases.

The solvent which is chosen for any particular reaction according to the invention will depend upon the reactants and the conditions to be used. That is, under the conditions used it must be liquid, must be capable of dissolving at least a moderate amount of the acid, and must be inert with respect to the materials present. It must also be essentially free of water in order to avoid unnecessary decomposition of the difluoromethyl ester product. Among the suitable solvents are dichloromethane, carbon tetrachloride, dioxane, chloroform, diglyme, acetonitrile, trichlorofluoromethane, acetone, etc. The boiling point of the solvent is not critical for the reaction although in some cases the lower boiling solvents are desirable because they facilitate separation of the difluoromethyl ester product.

The difluoromethyl ester group of the carboxylate esters described in this invention can usually be characterized by infrared absorptions in the region of about 5.3 to 5.8 microns ($\mu$) which are associated with carbon-oxygen unsaturation and absorptions in the region of about 8.4 to 9.8 microns which are associated with the carbon-fluorine of the —CF$_2$H group.

The difluoromethyl group of the sulfonate esters of the invention can usually be characterized by infrared absorption in the region of about 6.7 to 7.6 microns which are associated with one of the absorptions of the sulfonate moiety.

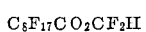

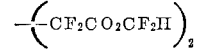

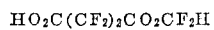

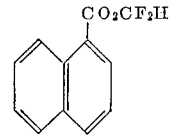

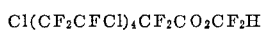

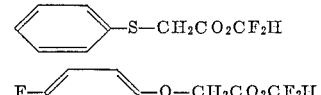

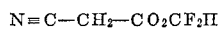

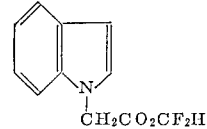

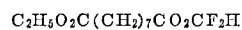

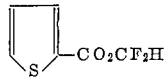

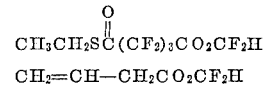

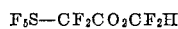

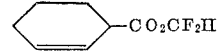

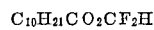

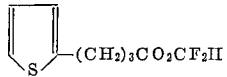

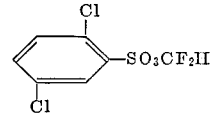

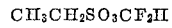

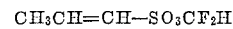

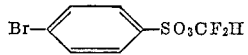

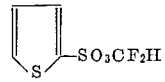

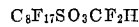

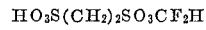

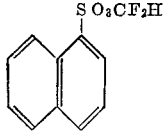

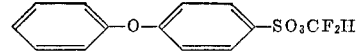

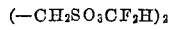

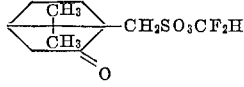

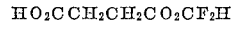

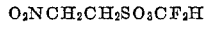

Fluorine and proton nuclear magnetic resonance spectroscopic measurements are particularly useful for the identification of the described compounds. Various types of fluorine-containing groups in the molecule can be distinguished by their shielding values expressed on $\phi$ units, employing $CFCl_3$ as the standard as described by G. Filipovich and G. V. D. Tiers (Journal of Physical Chemistry, Vol. 63, pp. 761–762, 1959); the $\phi^*$ values defined there by the authors are here given simply as $\phi$ values. Likewise, various types of hydrogen containing groups in the molecule can be distinguished by their shielding values expressed simply as $\tau$ when tetramethylsilane is employed as the reference as described by G. V. D. Tiers (Journal of Physical Chemistry, vol. 62, p. 1151, 1958). The difluoromethyl ester functional group,

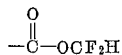

usually exhibits shielding values in the range of about 80 to 100$\phi$, and especially in the 90 to 95$\phi$ region, for the fluorine atoms of the —$CF_2H$ group in the range of about 2.5 to 3.5$\tau$ for the hydrogen of the —$CF_2H$ group. In the fluorine nuclear magnetic resonance sepectra, the difluoromethyl sulfonate esters usually exhibit shielding values in the range of about 70–90$\phi$, and especially in the 80–85$\phi$ region, for the fluorine atoms of the —$CF_2H$ group and in the range of about 2.5 to 3.5$\tau$ for the hydrogen of the —$CF_2H$ group. The nuclear magnetic resonance spectra of the compounds of the invention are especially diagnostic for the presence of the difluoromethyl ester moiety because the fluorine absorption of the group in the 70 to 100$\phi$ region appears as a doublet due to spin-spin coupling with the hydrogen atom. As a result of similar couplings, the proton spectra of compounds containing the desired group show a triplet structure in the 2.5 to 3.5$\tau$ region.

The products of the process of the invention are generally reactive esters and as such are useful as chemical intermediates. By virtue of the polarity of the difluoromethyl ester moiety, the products are useful as solvents and plasticizers. They are more soluble as a class in less polar solvents than are the acids from which they are derived. In cases in which the R group of the ester is a fluorocarbon alkyl group the chemical reactivity of the difluoromethyl ester enables one to impart oil and water resistant character to other materials.

Polymeric compounds containing the appropriate carboxylic or sulfonic acid groups can be reacted under the conditions as set forth hereinabove, to produce polymers having difluoromethyl ester substituents. Such polymers, being reactive by virtue of the difluoromethyl ester groups, can be chain extended or crosslinked, to produce high molecular weight polymers variously useful as gaskets, coatings, sealants, adhesives, etc.

The products of the process of the invention are shown above.

In order to disclose more clearly the process of the invention, a number of specific examples will now be given. All parts are by weight unless otherwise designated. In the photolysis examples, suitable ultraviolet-transparent glass ampoules are used. For convenience, the reactants and products which appear in the examples are identified by structure in Table I.

TABLE I

| Example No. | Acid | Difluoromethyl Ester |
|---|---|---|
| 1 | $CF_3CO_2H$ | $CF_3CO_2CF_2H$ |
| 2 | $CF_3CO_2H$ | $CF_3CO_2CF_2H$ |
| 3 | $C_3F_7CO_2H$ | $C_3F_7CO_2CF_2H$ |
| 4 | $C_4H_9CO_2H$ | $C_4H_9CO_2CF_2H$ |
| 5 | ⟨benzene⟩—$CO_2H$ | ⟨benzene⟩—$CO_2CF_2H$ |
| 6 | Cl-⟨benzene⟩—$CO_2H$ | Cl-⟨benzene⟩—$CO_2CF_2H$ |
| 7 | ⟨naphthalene⟩—$CO_2H$ | ⟨naphthalene⟩—$CO_2CF_2H$ |
| 8 | ⟨furan⟩—$CO_2H$ | ⟨furan⟩—$CO_2CF_2H$ |
| 9 | $(\text{—}CH_2CH_2CO_2H)_2$ | $HO_2C\text{—}(CH_2)_4CO_2CF_2H$ and $(\text{—}CH_2CH_2CO_2CF_2H)_2$ |
| 10 | $CF_3SO_3H$ | $CF_3SO_3CF_2H$ |
| 11 | $C_4H_9SO_3H$ | $C_4H_9SO_3CF_2H$ |
| 12 | $CH_3\text{—}$⟨benzene⟩$\text{—}SO_3H$ | $CH_3\text{—}$⟨benzene⟩$\text{—}SO_3CF_2H$ |
| 13 | ⟨naphthalene⟩—$SO_3H$ | ⟨naphthalene⟩—$SO_3CF_2H$ |

EXAMPLE 1

*Preparation of difluoromethyl trifluoroacetate*

A dry 5 cc. heavy-wall glass ampoule is charged with 0.57 g. ($5 \times 10^{-3}$ moles) of trifluoroacetic acid and 1 ml. of carbon tetrachloride. This mixture is cooled to liquid nitrogen temperature and degassed by reducing the pressure in the ampoule to not more than about one-tenth of a mm. of mercury pressure. A 0.078 g. ($1 \times 10^{-3}$ moles) sample of difluorodiazirine is then introduced into the ampoule by condensation and the ampoule is sealed. The reactants are then allowed to come to room temperature (i.e. approximately 25° C.). The vapor- or gas-filled portion of the ampoule is then covered with aluminum foil and the liquid phase of the mixture is irradiated for 18 hrs. with a 1,000 watte ultraviolet lamp. At the end of this time the ampoule is cooled to liquid nitrogen temperature and opened. Preliminary separation of the difluoromethyl ester from the unreacted carboxylic acid is effected by utilizing fraction distillation-condensation techniques with receivers cooled to −78° and −196° C. The −196° C. trap contains $7.5 \times 10^{-4}$ moles (75% yield of essentially pure difluoromethyl trifluoroacetate. Preparative vapor phase chromatography is employed for the final purification. This material contains 21.7% of carbon, and 58.4% of fluorine as compared to calculated values of 22.0 and 57.9, respectively. The molecular weight of this product is found to be 162 as compared to a calculated value of 164. The infared and nuclear magnetic resonance spectra of this material support the assigned structure. The presence of the difluoromethyl ester moiety in the product is established by a doublet ($J=68.8$ c.p.s) at 91.0$\phi$ in the fluorine nuclear magnetic resonance spectrum and a triplet ($J=68.2$ c.p.s) at 2.89$\tau$ in the portion spectrum.

EXAMPLE 2

*Preparation of difluoromethyl trifluoroacetate*

A dry 10 cc. heavy-wall glass ampoule is charged with 0.57 g. ($5 \times 10^{-3}$ moles) of trifluoroacetic acid and cooled to liquid nitrogen temperature. The sample is degassed by reducing the pressure in the ampoule to not more than about one- tenth of a mm. of mercury pressure and 0.156 g. ($2 \times 10^{-3}$ moles) of difluorodiazirine is then added by condensation. The ampoule is sealed and the mixture is allowed to warm to 25° C., after which it is heated to and maintained at 130–140° C. for 16 hours. After the heating period, the ampoule is cooled to −196° C., opened and the volatile contents separated by fractional distillation-condensation employing receivers cooled to −78° and −196° C. The −196° C. receiver is found to contain about $0.624 \times 10^{-3}$ moles (31% yield) of difluoromethyl trifluoroacetate which is purified by vapor phase chromatography. The difluoromethyl trifluoroacetate is identified by comparison of its infrared spectrum to that of an authentic sample prepared in Example 1.

EXAMPLE 3

*Preparation of difluoromethyl heptafluorobutyrate*

A dry 1 cc. glass ampoule is charged with 0.428 g. ($2 \times 10^{-3}$ moles) of heptafluorobutyric acid. This material is cooled to liquid nitrogen temperature and degassed by reducing the pressure in the ampoule to not more than about one-tenth of a mm. of mercury pressure. Difluorodiazirine, amounting to 0.078 g. ($1 \times 10^{-3}$ moles), is then introduced into the ampoule by condensation and the ampoule is sealed. The reactants are then allowed to come to room temperature and the vapor-filled portion of the ampoule is covered with aluminum foil to protect it from ultraviolet irradiation. The liquid phase of the mixture is irradiated for approximately 12 hours with a 1,000 watt ultraviolet lamp. At the end of this time the ampoule is cooled to liquid nitrogen temperature and opened. Preliminary separation of the difluoromethyl ester from the unreacted carboxylic acid is effected by fractional distillation-condensation through −23° and −196° C. receivers. The −196° C. receiver contains 0.132 g. (50% yield) of essentially pure difluoromethyl heptafluorobutyrate. Preparative vapor phase chromatography is employed for the final purification. This material contains 22.1% of carbon, and 64.6% of fluorine as compared to calculated values of 22.7 and 64.8%, respectively. The infrared and nuclear magnetic resonance spectra of this material support the assigned structure. The product exhibits a doublet ($J=68.6$ c.p.s.) at 91.8$\phi$ in the fluorine nuclear magnetic resonance spectrum and a triplet ($J=68.6$ c.p.s.) at 2.87$\tau$ in the proton spectrum.

EXAMPLE 4

*Preparation of difluoromethyl valerate*

A dry 15 cc. heavy-wall gas ampoule containing a magnetic stirring bar and fitted with a needle valve is charged with 0.816 g. ($8 \times 10^{-3}$ moles) of valeric acid and 3 ml. of dichloromethane. This mixture is cooled to liquid nitrogen temperature and degassed by reducing the pressure in the ampoule to not more than about one-tenth mm. of mercury pressure. A 0.312 g. ($4 \times 10^{-3}$ moles) sample of difluorodiazirine is then introduced into the ampoule by condensation and the needle valve on the ampoule is closed. The reactants are allowed to come to room temperature (i.e. about 25° C.). The vapor-filled portion of the reaction mixture contained in the ampoule is then covered with aluminum foil and the liquid phase of the mixture is stirred and irradiated for 18 hours with a 1,000 watt ultraviolet lamp. At the end of this time the ampoule is cooled to −196° C. and the needle valve is opened to effect preliminary separation of the difluoromethyl ester from the unreacted carboxylic acid. Fractional distillation-condensation through receivers cooled to −32° and −196° C. is employed. The contents of the −32° C. receiver are further purified by preparative vapor phase chromatography to afford 0.544 g. (88% yield) of the desired difluoromethyl ester product. This material contains 47.4% of carbon and 25.3% of fluorine, as compared to calculated values of 47.4 and 25.0%, respectively. The infrared and nuclear magnetic resonance spectra of this material support the assigned structure. Difluoromethyl valerate shows doublet ($J=70.8$ c.p.s.) at 92.7$\phi$ in the fluorine nuclear magnetic resonance spectrum and a triplet ($J=70.8$ c.p.s.) at 3.00$\tau$ in the proton spectrum.

EXAMPLE 5

*Preparation of difluoromethyl benzoate*

A dry 15 cc. heavy-wall glass ampoule containing a magnetic stirring bar and fitted with a needle valve is charged with 0.977 g. ($8 \times 10^{-3}$ moles) of benzoic acid and 5 ml. of dichloromethane. This mixture is cooled to −196° C. with liquid nitrogen, degassed to about one-tenth of a mm. of mercury pressure and 0.312 g. ($4 \times 10^{-3}$ moles) of difluorodiazirine is added by condensation. The needle valve is closed and the reactants are then allowed to come to room temperature. The liquid phase of the mixture is stirred and irradiated for approximately 16 hours with a 1,000 watt ultraviolet light source. At the end of this time the ampoule is cooled to liquid nitrogen temperature and the needle valve opened. The volatile products of the reaction are separated by fractional distillation-condensation by utilizing receivers cooled to −30° and −196° C. The −30° C. trap contains 0.516 g. (75% yield) of essentially pure difluoromethyl benzoate. Preparative vapor phase chromatography is employed for the final purification. This material contains 55.6% of carbon and 22.2% of fluorine, as compared to calculated values of 55.8 and 22.1%, respectively. Infrared and nuclear magnetic resonance spectra of this material support the assigned structure. The nuclear magnetic resonance spectra show a doublet ($J=70.7$ c.p.s.) at $91.9\phi$ in the fluorine spectrum and a triplet ($J=70.7$ c.p.s.) at $2.76\tau$ in the proton spectrum.

EXAMPLE 6

*Preparation of difluoromethyl-m-chlorobenzoate*

A dry 15 cc. heavy-wall glass ampoule containing a magnetic stirring bar and fitted with a needle valve is charged with 0.312 g. ($2 \times 10^{-3}$ moles) of m-chlorobenzoic acid and 5 ml. of dichloromethane. This mixture is cooled to $-196°$ C. with liquid nitrogen, degassed to about one-tenth of a mm. of mercury pressure and 0.156 g. ($2 \times 10^{-3}$ moles) of difluorodiazirine is added by condensation. The needle valve is closed and the reactants are then allowed to come to room temperature. The liquid phase of the mixture is stirred and irradiated for approximately 3 hours with a 1,000 watt ultraviolet light source. At the end of this time the ampoule is cooled to liquid nitrogen temperature and the needle valve is opened. The volatile products of the reaction are separated by fractional distillation-condensation by utilizing receivers cooled to $-30°$ and $-196°$ C. The difluoromethyl ester product is contained in the $-30°$ receiver and is identified by infrared and nuclear magnetic resonance spectroscopy after purification by vapor phase chromatography. A doublet ($J=69$ c.p.s.) at $91.6\phi$ in the fluorine nuclear magnetic resonance spectrum of the product is characteristic of the difluoromethyl ester group.

EXAMPLE 7

*Preparation of difluoromethyl-2-naphthoate*

A dry 15 cc. heavy-wall glass ampoule containing a magnetic stirring bar and fitted with a needle valve is charged with 0.344 g. ($2 \times 10^{-3}$ moles) of 2-naphthoic acid and 10 ml. of dichloromethane. This mixture is cooled to $-196°$ C. with liquid nitrogen, degassed to about one-tenth of a mm. of mercury pressure and 0.156 g. ($2 \times 10^{-3}$ moles) of difluorodiazirine is added by condensation. The needle valve is closed and the reactants are then allowed to come to room temperature. The liquid phase of the mixture is stirred and irradiated for approximately 3 hours with a 1,000 watt ultraviolet light source. At the end of this time the ampoule is cooled to liquid nitrogen temperature and the needle valve opened. The easily volatile products of the reaction are separated by fractional distillation-condensation. The non-volatile residue contained in the reactor is separated by solvent extraction and is found to contain difluoromethyl-2-naphthoate which is identified by infrared and nuclear magnetic resonance spectroscopy. The fluorine nuclear magnetic resonance spectrum of the product shows a doublet ($J=70$ c.p.s.) at $91.3\phi$.

EXAMPLE 8

*Preparation of difluoromethyl-2-furoate*

A dry 15 cc. heavy-wall glass ampoule containing a magnetic stirring bar and fitted with a needle valve is charged with 0.224 g. ($2 \times 10^{-3}$ moles) of 2-furoic acid and 4 ml. of chloroform. This mixture is cooled to $-196°$ C. with liquid nitrogen, degassed to about one-tenth of a mm. of mercury pressure and 0.156 g. ($2 \times 10^{-3}$ moles) of difluorodiazirine is added by condensation. The needle valve is closed and the reactants are then allowed to come to room temperature. The liquid phase of the mixture is stirred and irradiated for approximately 3 hours with a 1,000 watt ultraviolet light source. At the end of this time the ampoule is cooled to liquid nitrogen temperature and the needle valve opened. The easily volatile products of the reaction are removed by vacuum distillation and the remaining semi-solid residue is extracted with 1 cc. of chloroform. A fluorine nuclear magnetic resonance spectrum of the extract reveals a doublet ($J=72$ c.p.s.) at $90.6\phi$ characteristic of the difluoromethyl ester moiety.

EXAMPLE 9

*Preparation of difluoromethyl hydrogen adipate and bis(difluromethyl)adipate*

A dry 15 cc. heavy-wall glass ampoule containing a magnetic stirring bar and fitted with a needle valve is charged with 0.146 g. ($1 \times 10^{-3}$ moles) of adipic acid and 4 ml. of acetone. This mixture is cooled to $-196°$ C. with liquid nitrogen, degassed to about one-tenth of a mm. of mercury pressure and 0.234 g. ($3 \times 10^{-3}$ moles) of difluorodiazirine is added by condensation. The needle valve is closed and the reactants are then allowed to come to room temperature. The liquid phase of the mixture is stirred and irradiated for approximately 16 hours with a 1,000 watt ultraviolet light source. At the end of this time the needle valve is opened and the volatile products of the reaction are removed by vacuum distillation at $25°$ C. The non-volatile residue is extracted with three 2-ml. portions of dichloromethane and centrifuged. The dichloromethane layer is separated, evaporated to dryness and re-extracted with two 0.5-ml. portions of dichloromethane to remove any remaining unreacted adipic acid. Evaporation of the dichloromethane extract affords 0.171 gram of a mixture of difluoromethyl hydrogen adipate and bis(difluoromethyl)adipate. The difluoromethyl ester group of the products appears as a doublet ($J=70.5$ c.p.s.) at $92.5\phi$ in the fluorine nuclear magnetic resonance spectrum. The infrared spectrum shows absorptions due to both the carbonyl group of the ester and the acid, as well as the expected carbon-fluorine absorptions in the 9.0–9.6 micron region.

EXAMPLE 10

*Preparation of difluoromethyl trifluoromethylsulfonate*

A dry 1 cc. glass ampoule is charged with 0.68 g. ($4.5 \times 10^{-3}$ moles) of trifluoromethanesulfonic acid. This material is cooled to liquid nitrogen temperature and degassed by reducing the pressure in the ampoule to not more than about one-tenth of a mm. of mercury pressure. Difluorodiazirine, amounting to 0.078 g. ($1 \times 10^{-3}$ moles), is then introduced into the ampoule by condensation and the ampoule is sealed. The reactants are then allowed to come to room temperature and the vapor portion of the ampoule is covered with aluminum foil to protect it from ultraviolet irradiation. The liquid phase of the mixture is irradiated for approximately 16 hours with a 1,000 watt ultraviolet lamp. At the end of this time the ampoule is cooled to liquid nitrogen temperature and opened. Preliminary separation of the difluoromethyl ester from the unreacted sulfonic acid is effected by fractional distillation-condensation through $-23°$ and $-196°$ C. receivers. The $-196°$ C. receiver contains 85% yield of essentially pure difluoromethyl trifluoromethylsulfonate. Preparative vapor phase chromatography is employed for the final purification. This material contains 12.0% of carbon and 47.4% of fluorine as compared to calculated values of 12.0 and 47.5%, respectively. The infrared and nuclear magnetic resonance spectra of this material support the assigned structure. The nuclear magnetic resonance spectra show a doublet ($J=68.5$ c.p.s.) at $82.9\phi$ in the fluorine spectrum and a triplet ($J=68.5$ c.p.s.) at $3.16\tau$ in the proton spectrum.

EXAMPLE 11

*Preparation of difluoromethyl butylsulfonate*

A dry 15 cc. heavy-wall glass ampoule containing a magnetic stirring bar and fitted with a needle valve is charged with 1.104 g. ($8 \times 10^{-3}$ moles) of butanesulfonic acid and 5 ml. of dichloromethane. This mixture is cooled to $-196°$ C. with liquid nitrogen, degassed to about one-tenth of a mm. of mercury pressure and 0.312 g. ($4 \times 10^{-3}$ moles) of difluorodiazirine is added by condensation. The needle valve is closed and the reactants are then allowed to come to room temperature. The liquid phase of the mixture is stirred and irradiated for approximately 16 hours with a 1,000 watt ultraviolet light source. At the end of this time the ampoule is cooled to liquid nitrogen temperature and the needle valve opened. The volatile products of the reaction are separated by fractional distillation-condensation by utilizing receivers cooled to $-30°$ and $-196°$ C. The $-30°$ C. trap contains essentially pure difluoromethyl butylsulfonate. Preparative vapor phase chromatography is employed for the final purification. The infrared and nuclear magnetic resonance spectra of this material support the assigned structure.

EXAMPLE 12

*Preparation of difluoromethyl-p-toluenesulfonate*

A dry 10 cc. heavy-wall glass ampoule containing a magnetic stirring bar and fitted with a needle valve is charged with 0.688 g. ($4 \times 10^{-3}$ moles) of p-toluenesulfonic acid and 5 ml. of acetonitrile. This mixture is cooled to $-196°$ C. with liquid nitrogen, degassed to about one-tenth of a mm. of mercury pressure and 0.156 g. ($2 \times 10^{-3}$ moles) of difluorodiazirine is added by condensation. The needle valve is closed and the reactants are then allowed to come to room temperature. The liquid phase of the mixture is stirred and irradiated for approximately 16 hours with a 1,000 watt ultraviolet light source. At the end of this time the ampoule is cooled to liquid nitrogen temperature and the needle valve opened. The volatile products of the reaction are separated by fractional distillation-condensation by utilizing receivers cooled to $-15°$ and $-196°$ C. The $-15°$ C. trap contains essentially pure difluoromethyl-p-toluenesulfonate. Preparative vapor phase chromatography is employed for the final purification. The infrared and nuclear magnetic resonance spectra of this material support the assigned structure.

EXAMPLE 13

*Preparation of difluoromethyl-2-naphthylsulfonate*

A dry 15 cc. heavy-wall glass ampoule containing a magnetic stirring bar and fitted with a needle valve is charged with 2.10 g. ($6 \times 10^{-3}$ moles) of 2-naphthalenesulfonic acid and 10 ml. of acetonitrile. This mixture is cooled to $-196°$ C. with liquid nitrogen, degassed to about one-tenth of a mm. of mercury pressure and 0.312 g. ($4 \times 10^{-3}$ moles) of difluorodiazirine is added by condensation. The needle valve is closed and the reactants are then allowed to come to room temperature. The liquid phase of the mixture is stirred and irradiated for approximately 16 hours with a 1,000 watt ultraviolet light source. At the end of this time the ampoule is cooled to liquid nitrogen temperature and the needle valve opened. The easily volatile products of the reaction are removed by vacuum distillation. The non-volatile residue contained in the reactor is purified by solvent extraction and is found to contain difluoromethyl-2-naphthylsulfonate which is identified by infrared and nuclear magnetic resonance spectroscopy.

In a similar manner difluoromethyl perfluorooctylsulfonate is prepared from perfluorooctane sulfonic acid and difluorodiazirine utilizing dichloromethane solvent.

What is claimed is:

1. A process for the preparation of a compound of the formula

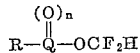

wherein R is an organic radical which is free of active hydrogen having $pK_a$ greater than 7, Q is an atom in its highest oxidation state selected from the class consisting of carbon and sulfur, and $n$ is 1–2 which comprises reacting an acid of the formula

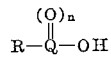

with difluorocarbene.

2. A process according to claim 1 wherein Q is carbon.
3. A process according to claim 1 wherein Q is sulfur.
4. A process according to claim 1 wherein R contains only carbon and fluorine.
5. A process according to claim 1 wherein R is an aliphatic hydrocarbon group.
6. A process according to claim 1 wherein R is an aromatic hydrocarbon group.
7. A compound of the formula

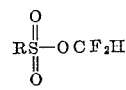

wherein R is an organic radical which is free of active hydrogen having $pK_a$ greater than 7.

8. A compound according to claim 7 wherein R is perfluoroalkyl.
9. A compound according to claim 7 wherein R is a mixed aliphatic-aromatic group.
10. A compound according to claim 7 wherein R is an aromatic-hydrocarbon group.
11. Difluoromethyl trifluoromethylsulfonate.
12. Difluoromethyl butylsulfonate.
13. Difluoromethyl-p-toluenesulfonate.
14. Difluoromethyl-2-naphthylsulfonate.
15. Difluoromethyl perfluorooctylsulfonate.

References Cited by the Examiner

FOREIGN PATENTS 827,570   2/1960   Great Britain.

CHARLES B. PARKER, *Primary Examiner.*

REUBEN EPSTEIN, *Examiner.*

L. A. SEBASTIAN, F. D. HIGEL, *Assistant Examiners.*